United States Patent [19]
Rothman

[11] Patent Number: 5,921,265
[45] Date of Patent: Jul. 13, 1999

[54] VALVE OPERATING DEVICE

[75] Inventor: Ulf Rothman, Skanor, Sweden

[73] Assignee: Ashbourne Limited, Fuernsey, United Kingdom

[21] Appl. No.: 08/860,826

[22] PCT Filed: Feb. 6, 1997

[86] PCT No.: PCT/SE96/00137

§ 371 Date: Nov. 28, 1997

§ 102(e) Date: Nov. 28, 1997

[87] PCT Pub. No.: WO96/24499

PCT Pub. Date: Aug. 15, 1996

[30] Foreign Application Priority Data

Feb. 8, 1995 [SE] Sweden ............................ 9500462

[51] Int. Cl.$^6$ .................................................. F16K 17/36
[52] U.S. Cl. ............................ 137/38; 137/43; 137/48
[58] Field of Search ........................... 137/57, 38, 43, 137/48, 53, 50

[56] References Cited

U.S. PATENT DOCUMENTS

| | | | |
|---|---|---|---|
| 1,102,296 | 7/1914 | Porter | 137/38 X |
| 3,996,951 | 12/1976 | Parr et al. | 137/43 |
| 4,378,815 | 4/1983 | Mochida et al. | 137/43 |
| 4,657,057 | 4/1987 | Ha | 137/57 |
| 4,779,637 | 10/1988 | Ubaldi | 137/43 |

FOREIGN PATENT DOCUMENTS 503639  7/1996  Sweden.

*Primary Examiner*—Stephen M. Hepperle
*Attorney, Agent, or Firm*—James Ray & Associates

[57] ABSTRACT

A device for operating a valve (1), preferably for a tire valve of a car, where a valve actuating pin (3) is biased to a valve-closing extended position and is to be depressed for opening the valve, has a disc-shaped operating member (6) arranged in a housing (4), which is mounted on the valve. The operating member is provided with a central recess (6') with gradually sloping sides in its surface facing the pin. An operating rod (7) is axially movably arranged in the housing substantially in line with the pin, the rod engaging the recess with one of its ends and the pin with the other.

5 Claims, 1 Drawing Sheet

VALVE OPERATING DEVICE

TECHNICAL FIELD

The present invention relates to a device for operating a valve by means of movements, the valve having an external valve actuating pin and for example being a vehicle tire valve.

BACKGROUND OF THE INVENTION

It is well known that air can be admitted to the tire through a vehicle tire valve and that air can be let out from the tire by depressing the valve actuating pin (which can also be called a valve needle).

Numerous attempts to prevent thefts of cars have been made, and it would lead too far here to make even a short list of the different categories of these attempts. Unfortunately, the theft prevention measures taken have not been entirely successful; too many cars are still stolen.

The basic thought behind the present invention is that it is virtually impossible to drive a car any substantial distances with one or more flat tires and that a device automatically accomplishing a flat tire at an unauthorized attempt to drive the car would constitute a very effective anti-theft device.

THE INVENTION

In order for such a device to be commercially successful it has to be as simple and cheap as possible but yet fulfil its intended purpose in an extremely reliable way. At the design of such a device the extremely harsh environment at a vehicle wheel has to be taken into account.

A valve operating device according to the invention is characterized by an operating member, which

- is arranged in a housing connected to the valve,
- is movable in the housing substantially perpendicular to the actuating direction of the pin, and
- is provided with gradual height height differences in the surface facing the pin,
- means being provided to transfer to the pin an actuating movement imparted by the height differences of the member at its movements in the housing.

If a car or any other vehicle provided with such a device on at least one of its tire valves is moved, so that the wheels roll, the operating member will move in the housing mainly under the action of the centrifugal force, whereby—through the interaction between the height differences in the operating member and the means to transfer to the pin the actuating movement—the valve pin will be actuated to its valve opening position, so that the air will be let out of the tire and the tire quickly will become flat.

In a practical embodiment, where the valve pin is biased to a valve-closing extended position and is to be depressed for opening the valve, the operating member is disc-shaped and is provided with a central recess with gradually sloping sides in its surface facing the pin.

Preferably, an operating rod is axially movably arranged in the housing substantially in line with the pin, the rod engaging the recess with one of its ends and the pin with the other.

When a device according to the invention is mounted on an air valve of a car wheel, the operating member can assume a more or less vertical position. In such a case spring means are arranged between the operating member and the housing in order to bias the operating member towards a central, neutral position in the housing. Only when the operating member is exposed to a centrifugal force, it will be transferred from this position against the action of the spring means to the valve operating or opening position.

When a device according to the invention has been mounted on a vehicle valve, it has to be locked thereto, so that no unauthorized person can remove it from the valve. The locking means do not per se form any part of the invention and can be of any conventional type. The type used for lockable fuel tank covers or lockable wheel bolts may for example be utilized also for this purpose. It is also possible to use an electronically operated locking means.

Normally, the device according to the invention is to be unlocked and removed from the valve, before the car is used by an authorized driver. As an alternative, however, it is possible to have the device permanently mounted on the valve and to use the lock to immobilize the operating member before authorized use of the car.

The device according to the invention is primarily designed for the purpose of preventing unauthorized use of a car by accomplishing a flat tire, if the car is driven away, but the device can be utilized in many other instances, where a valve is to be operated. The device can for example be used for a valve on a spray container, for example filled with shaving cream or the like. By simply shaking the container on which the device according to the invention is fitted the valve will be opened and the contents of the container be let out.

Another possible use is as a safety device for rail-bound vehicles: an emergency braking may be initiated if the vehicle provided with a safety valve and a device according to the invention unintentionally starts to roll.

It appears that the operating member is primarily acted on by the centrifugal force, when the device is used on a tire valve. In other uses other external forces may act on the operating member, and the spring means between the operating member and the housing may be omitted.

BRIEF DESCRIPTION OF THE DRAWING

The invention will be described in further detail below reference being made to the accompanying drawing, in which.

DETAILED DESCRIPTION OF A PREFERRED EMBODIMENT

Figure 1:
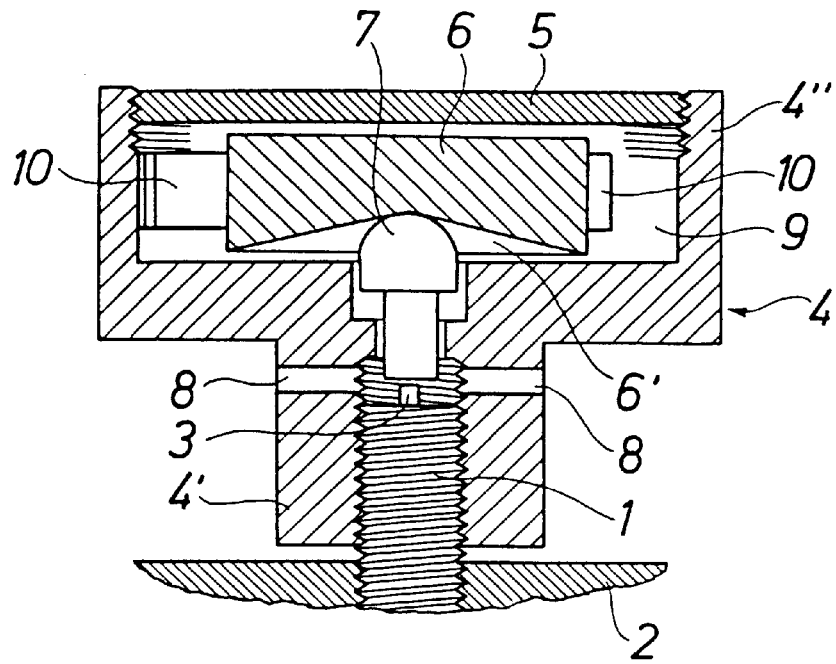
FIG. 1 is a cross section of a device according to the invention and FIG. 2 is a top view of this device with a cover removed.
Figure 2:
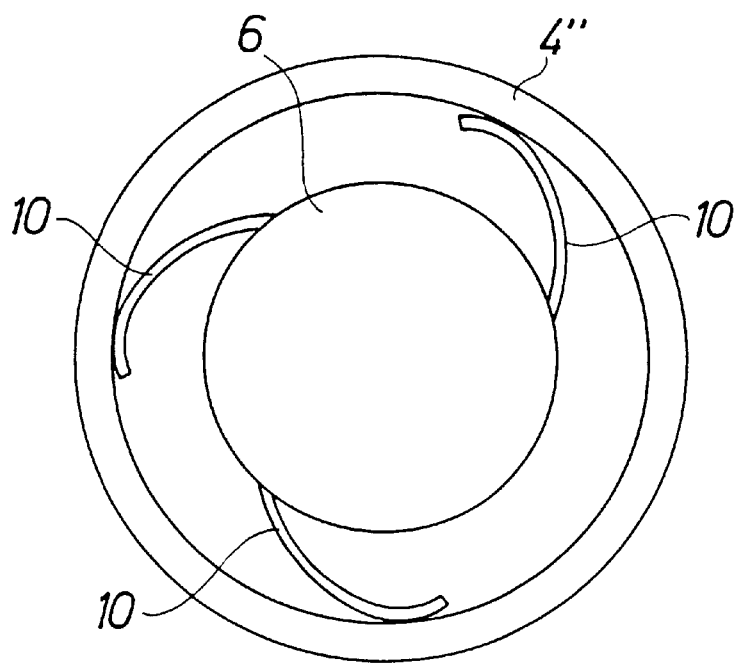

An air valve 1 and a very small part of a vehicle tire 2 are shown in FIG. 1. As is well known, the air valve is provided with a valve actuating pin 3, which is spring-biased to the shown, closed position but which can be depressed for opening the valve, so that the air in the tire can emerge through the valve.

A device according to the invention can be threaded on to this valve 1, which is provided with an external thread. This device has a housing 4 with a cover 5, an operating member 6, and an operating rod 7.

A neck portion 4' of the housing 4, which is threaded on to the valve 1, is provided with vent holes 8 for allowing air to escape from the valve 1 when opened.

A chamber 9 is formed in the main portion 4" of the housing 4. This chamber is preferably circular and is closed by the cover 5, which is releasably fastened to the housing, for example by means of screw threads.

The operating member 6 preferably is circular and disc-shaped and has a considerably smaller diameter but only slightly smaller height than the chamber 9, in which it is arranged. The operating member 6 is laterally movable in the chamber 9, i e perpendicularly to the actuating direction of the valve actuating pin 3. For a purpose to be described, the operating member 6 may be held in a central, neutral position in the chamber 9 by a number of springs 10, for example three equi-angularly disposed leaf springs, attached to the operating member 6. Compression springs may quite as well be used.

The operating member 6 is at its surface facing the valve actuating pin 3 provided with a central recess 6' with gradually sloping sides. The recess 6' may in other words be defined as being cone-shaped but may have any other similar shape, suitable under the circumstances.

In contact with the operating member 6 and in particular its recess 6' is the operating rod 7. This rod is axially movable in a guiding bore in the housing 4. Its upper end is preferably rounded and may be in smooth engagement with the recess 6', whereas its lower end can engage the valve actuating pin 3.

The arrangement is such that with the operating member 6 in the shown central rest position the operating rod will not influence the pin 3. If on the other hand the operating member 6 moves to any other position within the chamber 9, the operating rod 7 will be pressed down. Also the valve actuating pin 3 will be pressed down, so that air from the tire 2 will be allowed to escape through the valve 1 and the vent holes 8.

As described, the device according to the invention is mounted on a vehicle tire valve. The movement of the operating member 6 is in such a case the result of the movement of the vehicle: when the vehicle has reached a certain speed the centrifugal force acting on the member 6 will exceed the biasing force of the springs 10. If a vehicle provided with a device according to the invention is driven away, the tire with the device will soon be empty making further driving virtually impossible.

The purpose of the device according to the invention is to prevent any unauthorized use of the vehicle on which it is mounted. A prerequisite for this is that the device is locked to the valve and can be unlocked and removed for making authorized use of the vehicle possible. No such locking means are shown or decribed but may be of any type known for fuel tank covers or lockable wheel bolts. The locking means must be sturdy and simple to handle. A possibility is to utilize a remote control of a type already known in the vehicle industry.

I claim:

1. A device for operating a valve (1) by means of movements, the valve having an external valve actuating pin (3) and for example being a vehicle tire valve, characterized by an operating member (6), which is arranged in a housing (4) connected to the valve (1), is movable in the housing substantially perpendicular to the actuating direction of the pin (3), and is provided with gradual height differences (6') in the surface facing the pin, means (7) being provided to transfer to the pin an actuating movement imparted by the height differences of the operating member at its movements in the housing.

2. A device according to claim 1, the valve actuating pin (3) being biased to a valve-closing extended position and is to be depressed for opening the valve (1), characterized in that the operating member (6) is disc-shaped and is provided with a central recess (6') with gradually sloping sides in its surface facing the pin (3).

3. A device according to claim 2, characterized in that an operating rod (7) is axially movably arranged in the housing (4) substantially in line with the pin (3), the rod engaging the recess (6') with one of its ends and the pin with the other.

4. A device according to claim 2, characterized in that the housing (4) is provided with vent holes (8) in the vicinity of the valve (1).

5. A device according to claim 2, characterized in that spring means (10) are arranged between the operating member (6) and the housing (4) in order to bias the operating member towards a central position in the housing.

* * * * *